United States Patent
Chang

(10) Patent No.: US 7,178,752 B1
(45) Date of Patent: Feb. 20, 2007

(54) CRANK HANDLE FOR SPINNING REEL

(75) Inventor: Liang-Jen Chang, Taichung (TW)

(73) Assignee: Okuma Fishing Tackle Co., Ltd., Taichung (TW)

( * ) Notice: Subject to any disclaimer, the term of this patent is extended or adjusted under 35 U.S.C. 154(b) by 0 days.

(21) Appl. No.: 11/193,407

(22) Filed: Aug. 1, 2005

(51) Int. Cl.
*A01K 89/00* (2006.01)

(52) U.S. Cl. .................................. 242/284; 74/547

(58) Field of Classification Search ............ 242/282, 242/283, 284, 311; 74/547
See application file for complete search history.

(56) References Cited

U.S. PATENT DOCUMENTS

| | | | | |
|---|---|---|---|---|
| 3,091,978 A | * | 6/1963 | Rubinstein | 74/547 |
| 3,948,117 A | * | 4/1976 | Kimura | 74/547 |
| 4,332,358 A | * | 6/1982 | Neufeld | 242/321 |
| 4,588,141 A | * | 5/1986 | Uetsuki et al. | 242/284 |
| 5,443,570 A | * | 8/1995 | Hirano | 242/284 |
| 5,518,194 A | * | 5/1996 | Jeung | 242/283 |
| 6,382,543 B1 | * | 5/2002 | Chang | 242/249 |

\* cited by examiner

*Primary Examiner*—Kathy Matecki
*Assistant Examiner*—Evan Langdon
(74) *Attorney, Agent, or Firm*—Browdy and Neimark, PLLC

(57) ABSTRACT

A crank handle for a spinning reel includes an axle inserted through a base, an bush mounted on the axle inside the base and having two cut faces, a retaining member, which has an axial hole for receiving the axle and the bush, two notches at one end, and two flat portions for engaging the cut faces of the bush, a spring sleeved onto the bush and stopped between the base and the retaining member, and a handle, which is pivoted to one end of the axle and has two blocks for engaging the notches of the retaining member.

8 Claims, 7 Drawing Sheets ness of the flat portions 54 formed inside
CRANK HANDLE FOR SPINNING REEL

BACKGROUND OF THE INVENTION

1. Field of the Invention

The present invention relates generally to fishing tackles and more particularly to a highly stable and durable crank handle for a spinning reel.

2. Description of the Related Art

Referring to FIG. 1, a conventional spinning reel 1 is shown comprising a reel body 2, a crank handle 3, a spool 4, and a rotor 5. For easy storage or carrying, the crank handle 3 is made foldable.

As shown in FIGS. 2 and 3, the foldable crank handle 3 comprises a base 6, a axle 7 inserted through the base 6, a retaining member 8 sleeved onto the axle 7, a handle 9 pivoted to the axle 7, and a compression spring 91 sleeved onto the axle 7 and stopped between the base 6 and the retaining member 8. The compression spring 91 imparts a rightward force to the retaining member 8, causing an extension tube 92 of the handle 9 to engage into a through hole 93 of the retaining member 8 and to further prohibit rotation of the handle 9 relative to the axle 7.

Further, the axle 7 has two cut faces 94. The handle 9 has a slot 95 for receiving one end of the axle 7. The slot 95 of the handle 9 is engaged with the cut faces 94 of the axle 7 so that rotating the handle 9 drives the axle 7 to rotate. When wishing to fold the crank handle 3, push the retaining member 8 leftwards against the spring power of the compression spring 91 to disengage the retaining member 8 from the extension tube 92 of the handle 9, and therefore the handle 9 can be turned relative to the axle 7 to collapse the crank handle 3.

However, the limited contact area between the peripheral wall of the slot 95 and the cut faces 94 wears quickly with use. When this contact area starts to wear, the crank handle 3 becomes unstable.

SUMMARY OF THE INVENTION

The present invention has been accomplished under the circumstances in view. It is the main object of the present invention to incorporate a crank handle for spinning reel, which is highly stable and durable.

To achieve this and other objects of the present invention, the crank handle comprises an axle; a base, the base having a through hole through which the axle is inserted; a bush mounted on the axle within the through hole of the base, the bush having at least one cut face at one end thereof; a retaining member, the retaining member comprising an axial hole for receiving the axle and the bush, at least one notch formed in one end thereof, and at least one flat portion disposed at a periphery of the axial hole for engaging the at least one cut face of the bush; a spring sleeved onto the bush and stopped between the base and the retaining member; and a handle pivoted to one end of the axle, the handle having at least one block for engaging the at least one notch of the retaining member.

DETAILED DESCRIPTION OF THE INVENTION

Figure 1:
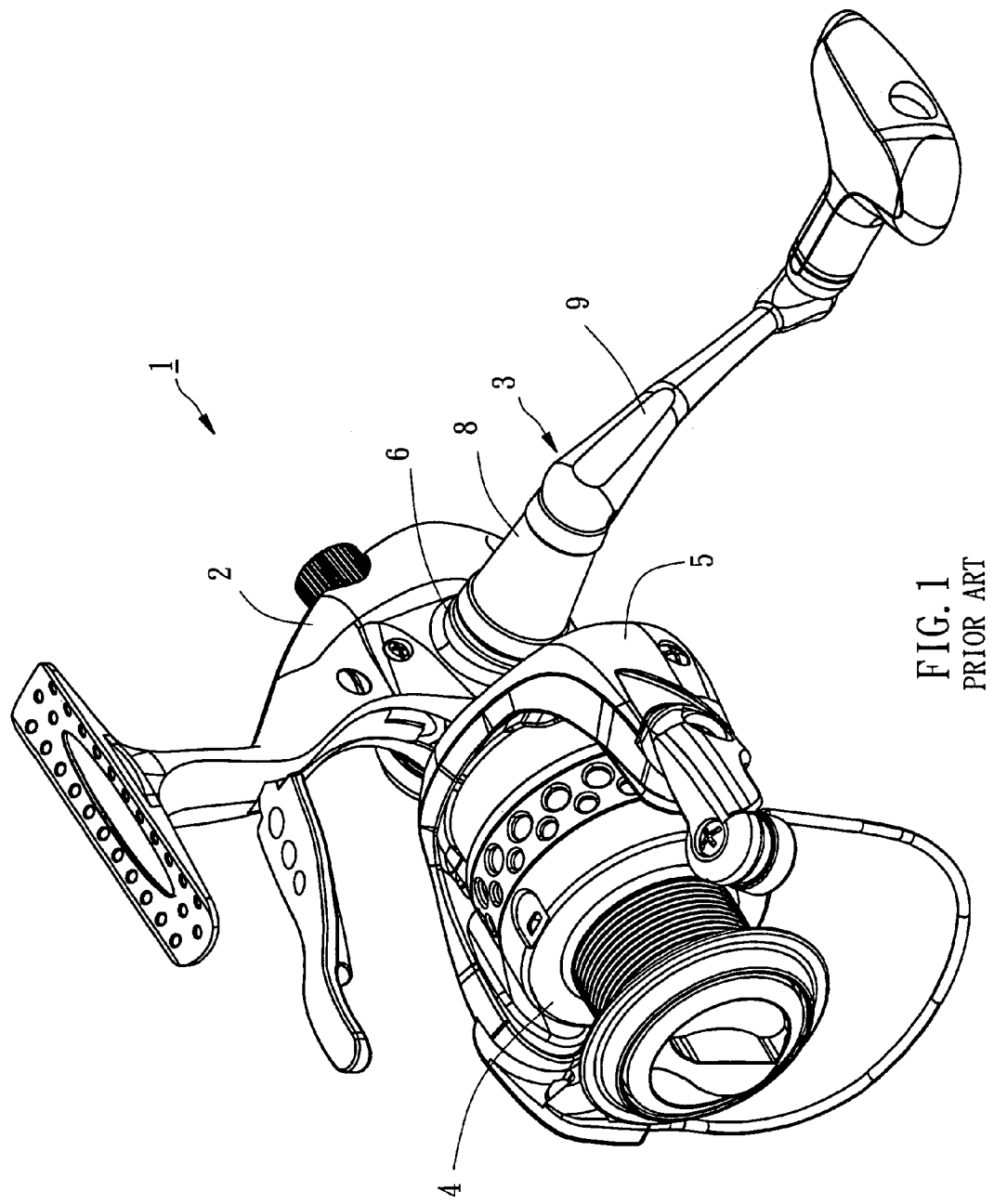
FIG. 1 is a perspective view of a conventional spinning reel.
Figure 2:
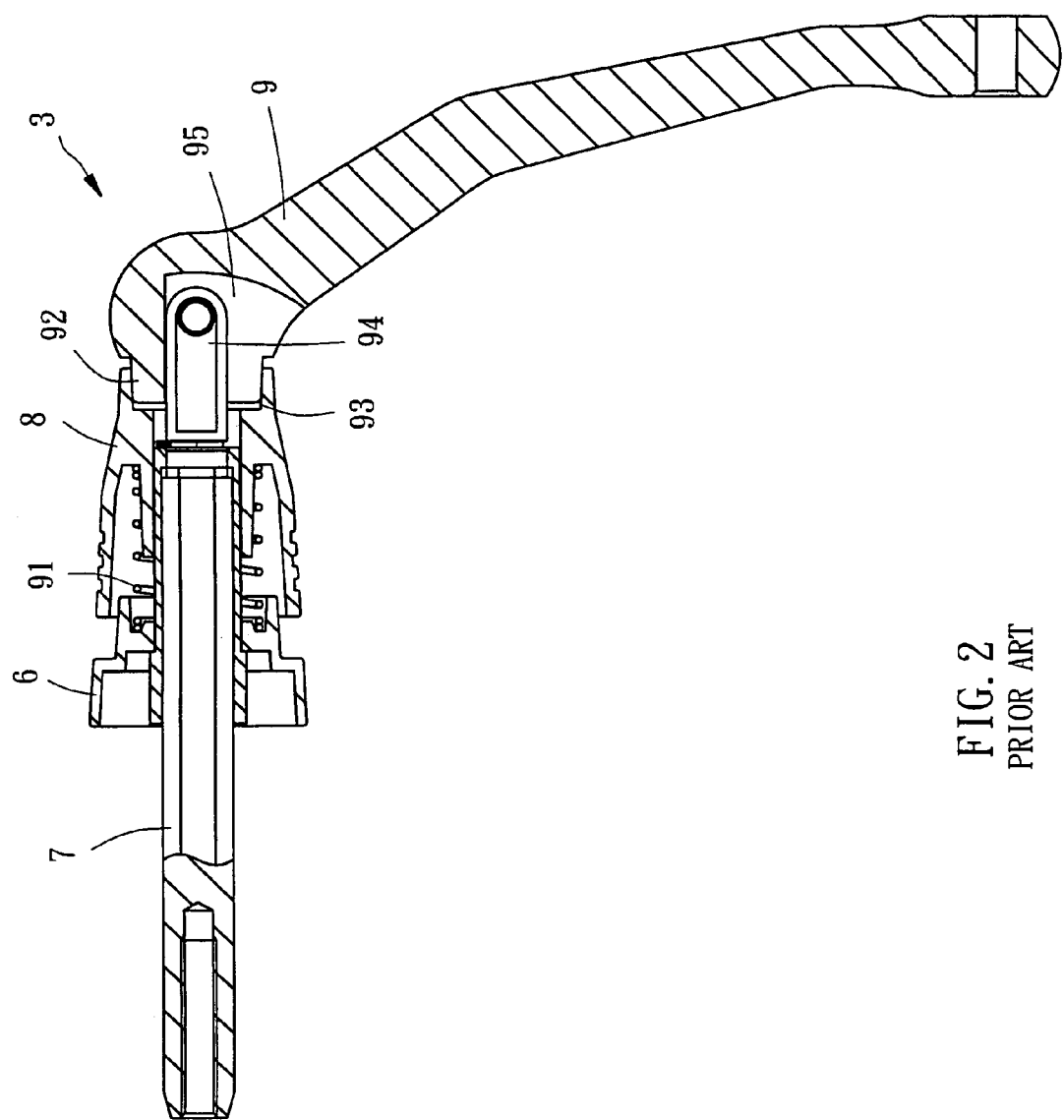
FIG. 2 is a sectional view of the crank handle used in the conventional spinning reel shown in FIG. 1.
Figure 3:
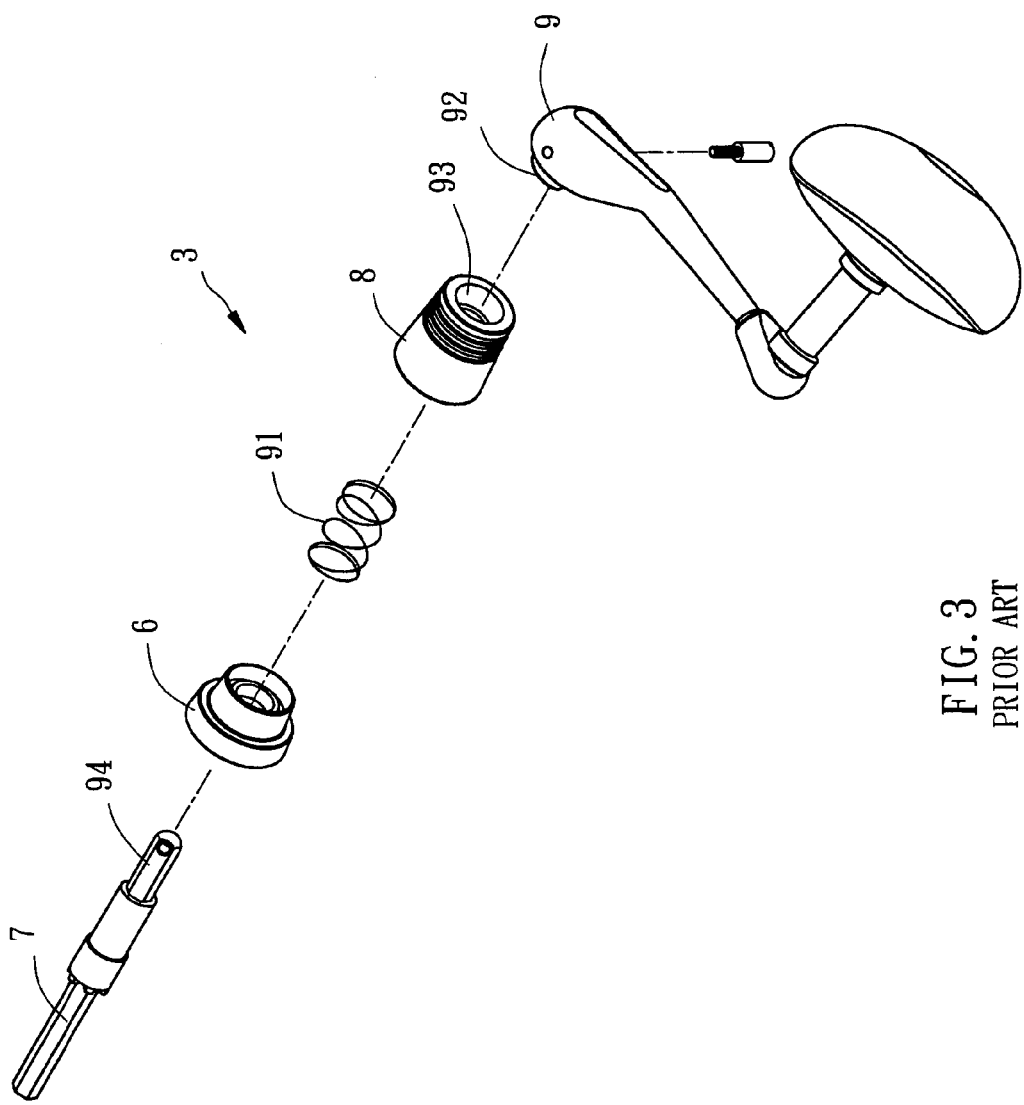
FIG. 3 is an exploded view of the crank handle shown in FIG. 2.
Figure 4:
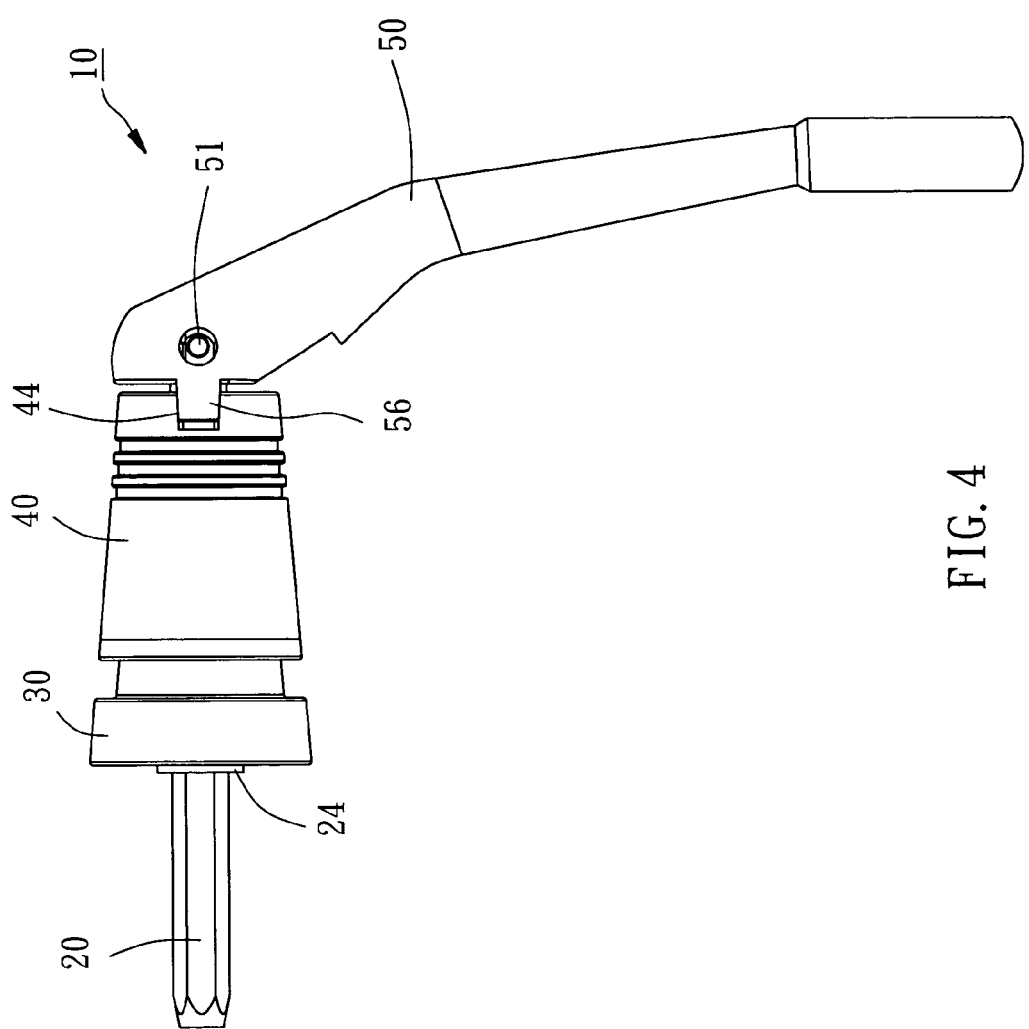
FIG. 4 is a front view of a crank handle for spinning reel according to a first embodiment of the present invention.
Figure 5:
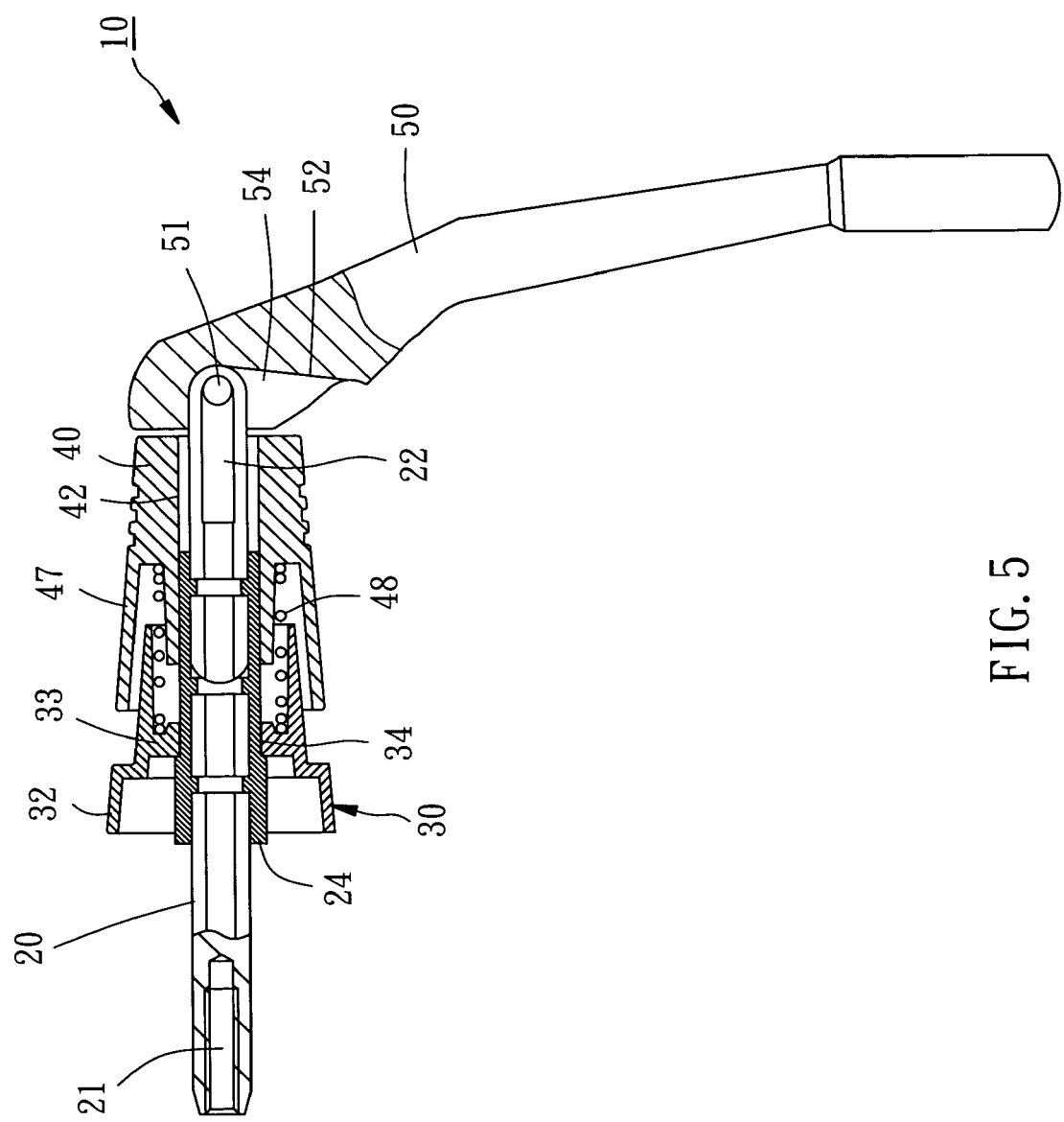
FIG. 5 is a sectional view of the crank handle for spinning reel according to the first embodiment of the present invention.
Figure 6:
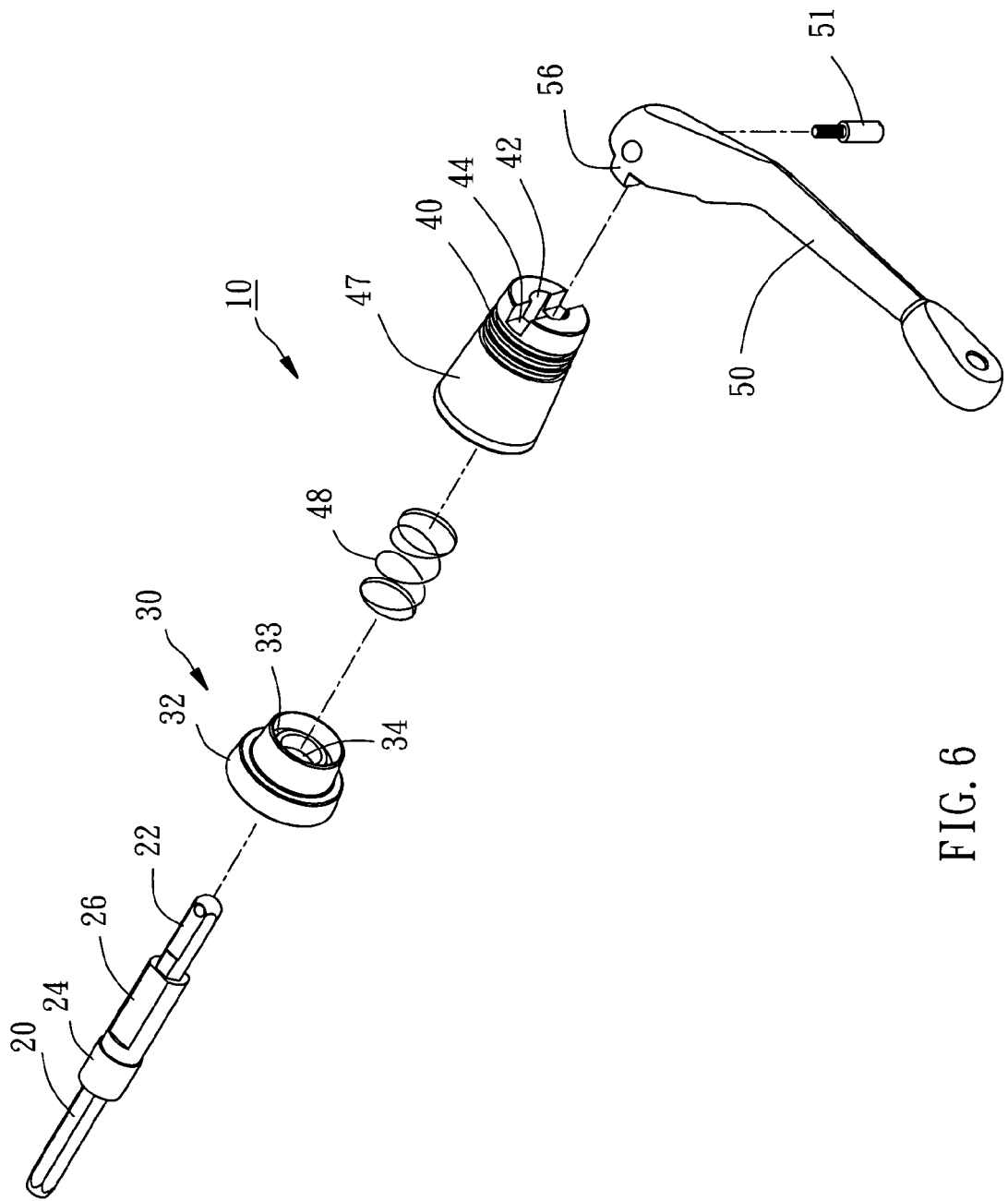
FIG. 6 is an exploded view of the crank handle for spinning reel according to the first embodiment of the present invention.

Referring to FIGS. 4–7, a crank handle 10 for a spinning reel in accordance with the first embodiment of the present invention is shown comprised of an axle 20, a base 30, a bush 24, a retaining member 40, a spring 48, and a handle 50.

The axle 20 has a screw hole 21 axially provided at one end thereof for fastening to the spinning reel with a screw (not shown), and two cut faces 22 longitudinally disposed at the other end thereof at two opposite sides. The axle 20 is a hexagonal rod member for engagement with another gear (not shown) in the spinning reel.

The base 30 comprises a tubular shell 32, a partition wall 33 transversely provided inside the tubular shell 32, and a through hole 34 provided at the partition wall 33 through which the axle 20 is inserted.

The bush 24 is sleeved onto the axle 20 and inserted into the through hole 34 of the base 30. The bush 24 rotatably fixed to the axle 20 so that the bush 24 and the axle 20 can be rotated relative to the base 30. The bush 24 has two cut faces 26 near one end.

The retaining member 40 has an axial hole 42 for receiving of the axle 20 and the bush 24, two notches 44 formed in one end thereof at two sides of the axial hole 42, a skirt 47 extending from a middle part thereof toward the base 30, and two flat portions 46 disposed at a periphery of the axial hole 42 for engaging the cut faces 26 of the bush 24. By means of engagement of the flat portions 46 of the retaining member 40 with the cut faces 26 of the bush 24, the retaining member 40 can be rotated with the bush 24 and the axle 20.

The spring 48 is sleeved onto the bush 24 within the tubular shell 32 of the base 30 and the skirt 47 of the retaining member 40, having two distal ends respectively stopped against the partition wall 33 of the base 30 and the retaining member 40 to force the base 30 and the retaining member 40 apart.

The handle 50 is pivotally connected to one end of the axle 20 with a pivot 51, having an opening 52 at one end for receiving the axle 20, and two flat portions 54 formed inside the opening 52 for engaging the cut faces 22 of the axle 20. By means of this structure, the user can operate the handle 50 to rotate the axle 20. The handle 50 further has two blocks 56 for engaging the notches 44 of the retaining member 40 so that the retaining member 40 can be rotated with the handle 50.

Because the base 30 is closely attached to the reel body of the spinning reel during normal use, the spring 48 forces the retaining member 40 into engagement with the handle 50. When the user rotating the handle 50, the flat portions 54 and the pivot 51 are forced to drive the axle 20 to rotate with the handle 50, and at the same time the blocks 56 are forced to drive the retaining member 40 to rotate with the handle 50. Because the flat portions 46 of the retaining member 40 are abutted against the cut faces 26 of the bush 24, rotating the retaining member 40 causes synchronous rotation of the axle 20. Therefore, the handle 50 directly drives the axle 20 to rotate, and simultaneously forces the retaining member 40 to rotate the bush 24 and the axle 20. The structure of the power transmission is stable and the contact area of each element is greater than conventional structure, prolonging the life of use of the crank handle.

Figure 8:
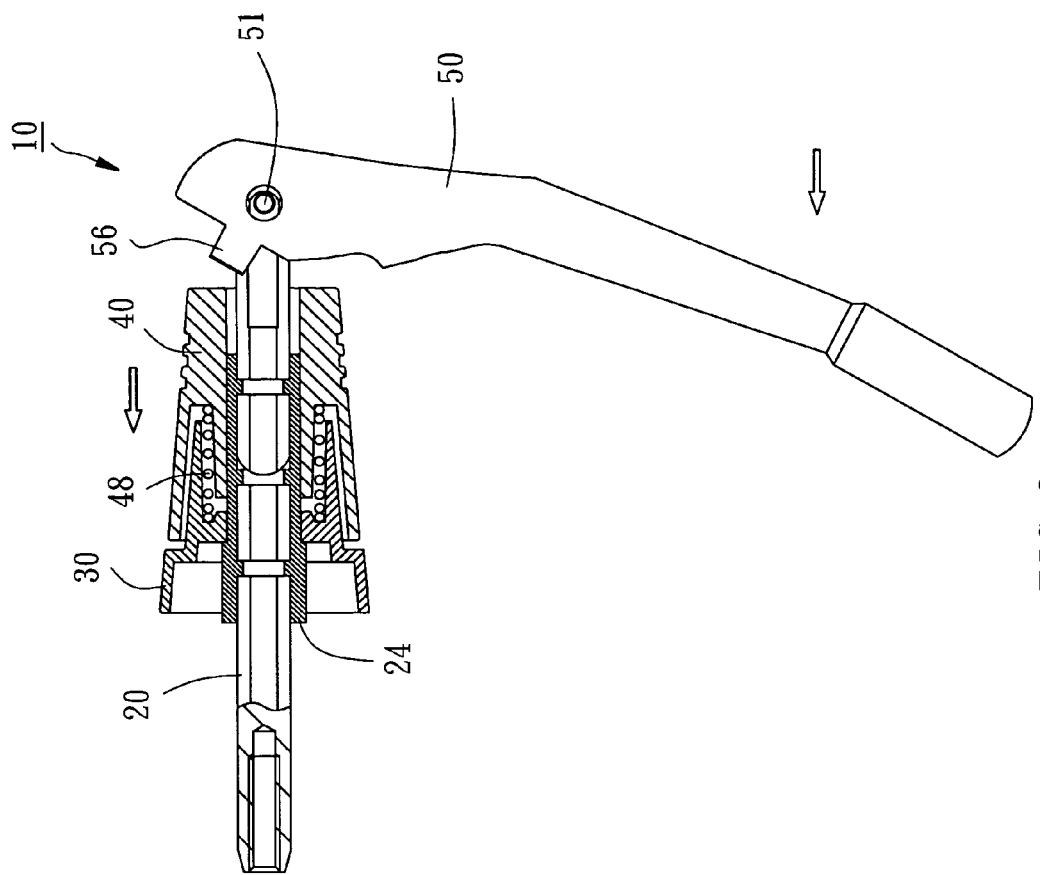
FIG. 8 is a schematic drawing showing the folding operation of the crank handle for spinning reel according to the first embodiment of the present invention.
Figure 7:
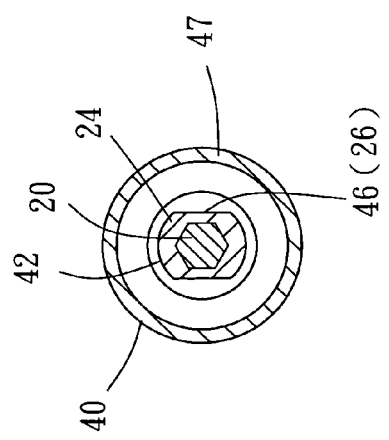
FIG. 7 is a sectional view of the retaining member used in the crank handle for spinning reel according to the first embodiment of the present invention.

When wishing to fold the crank handle 10, as shown in FIG. 8, move the retaining member 40 leftwards against the spring power of the spring 48 to disengage the retaining member 40 from the handle 50, allowing the handle 50 to be turned clockwise from the extended (operative) position to the folded (non-operative) position.

During actual fabrication, the axle can be made having two cut faces or only one single cut face at one end. Alternatively, the axle can be made having a non-circular cross section fitting the opening of the handle. Similarly, the bush can be made having only one cut face, or having a non-circular cross section fitting the axial hole of the retaining member. Further, the retaining member can be made having only one notch, and the handle can be made having only one block for engaging the notch of the retaining member. These modifications do not affect the functioning of the crank handle, and achieve the same effects as expected.

Figure 9:
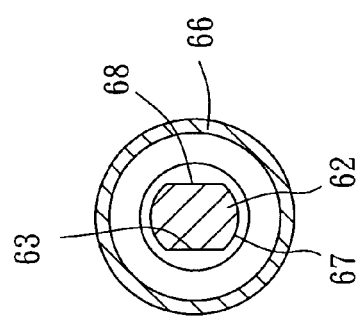
FIG. 9 is a sectional view of a crank handle for spinning reel according to a second embodiment of the present invention.

The aforesaid bush 24 may be eliminated. In this case, the axle is direction inserted through the through hole of the base, and the cut faces of the aforesaid bush are directly formed on the axle for engaging the flat portions of the retaining member. As shown in FIG. 9, the axle 62 of the crank handle according to the second embodiment of the present invention is inserted through the axial hole 67 of the retaining member 66, having two cut faces 63 for engaging the flat portions 68 of the retaining member 66. Other structure of this second embodiment is same as the aforesaid first embodiment of the present invention. This second embodiment has the same advantages of high structural stability and long service life.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A crank handle for a spinning reel, comprising:
   an axle;
   a base having a through hole through which the axle is inserted;
   a bushing mounted on said axle within the through hole of said base, said bushing having at least one cut face at one end thereof;
   a retaining member comprising an axial hole for receiving said axle and said bushing, at least one notch formed in one end thereof, and at least one flat portion a long the entire length of and in said axial hole corresponding to the at least one cut face of said bush;
   a spring sleeved onto said bush and stopped between said base and said retaining member; and
   a handle pivoted to one end of said axle, said handle having at least one block for engaging the at least one notch of said retaining member;
   wherein engagement of the handle to the retaining member engages the retaining member to the bushing and axle to permit the handle to rotate the axle.

2. The crank handle as claimed in claim 1, wherein said axle has at least one cut face at one end thereof; said handle has an opening through which one end of said axle is inserted, and at least one flat portion disposed at a periphery of said opening for engaging the at least one cut face of said axle.

3. The crank handle as claimed in claim 1, wherein said base comprises a tubular shell, a partition wall transversely disposed inside said tubular shell; the through hole of said base is provided at said partition wall; said spring is mounted inside said tubular shell of said base and stopped between said partition wall of said base and said retaining member.

4. The crank handle as claimed in claim 1, wherein said retaining member has a skirt surrounding said spring.

5. A crank handle for a spinning reel comprising:
   an axle having at least one cut face at one end thereof;
   a base having a through hole through which said axle is inserted;
   a retaining member comprising an axial hole for receiving said axle, at least one notch formed in one end thereof, and at least one flat portion a long the entire length of and in said axial hole corresponding to the at least one cut face of said axle;
   a spring sleeved onto said axle and stopped between said base and said retaining member; and
   a handle pivoted to one end of said axle, said handle having at least one block for engaging the at least one notch of said retaining member
   wherein engagement of the handle to the retaining member engages the retaining member to the axle to permit the handle to rotate the axle.

6. The crank handle as claimed in claim 5, wherein said handle has an opening for receiving one end of said axle, and at least one flat portion disposed at a periphery of said opening for engaging the at least one cut face of said axle.

7. The crank handle as claimed in claim 5, wherein said base comprises a tubular shell, a partition wall transversely disposed inside said tubular shell; the through hole of said base is provided at said partition wall; said spring is mounted inside said tubular shell of said base and stopped between said partition wall of said base and said retaining member.

8. The crank handle as claimed in claim 5, wherein said retaining member has a skirt surrounding said spring.

* * * * *